United States Patent

Lentini et al.

[11] Patent Number: 5,813,916
[45] Date of Patent: Sep. 29, 1998

[54] RETAINED NEEDLE THRUST WASHER

[75] Inventors: Anthony G. Lentini, St. Clair Shores; Glenn F. Gehrke, Davisburg; Craig Holt, Harrison Township; Patrick L. Kurzeja, White Lake, all of Mich.

[73] Assignee: Meritor Heavy Vehicle Systems, LLC, Troy, Mich.

[21] Appl. No.: 434,376

[22] Filed: May 3, 1995

[51] Int. Cl.$^6$ ..................................... F16D 3/16
[52] U.S. Cl. ............................ 464/128; 464/14; 464/130
[58] Field of Search .................................. 464/128, 130, 464/131, 132, 134, 136, 7, 14

[56] References Cited

U.S. PATENT DOCUMENTS

| | | | |
|---|---|---|---|
| 3,070,980 | 1/1963 | Slaght | 464/128 X |
| 3,937,035 | 2/1976 | Fisher et al. | 464/130 |
| 4,130,325 | 12/1978 | Schultenkamper | 464/131 X |
| 4,445,875 | 5/1984 | Kosuda et al. | 464/128 X |
| 4,710,150 | 12/1987 | Mangiavacchi | 464/131 X |
| 4,875,787 | 10/1989 | Bauer et al. | 464/128 X |

FOREIGN PATENT DOCUMENTS

| | | | |
|---|---|---|---|
| 1 211 492 | 2/1986 | U.S.S.R. | 464/128 |
| 1 477 910 | 6/1977 | United Kingdom | 464/128 |
| 2 082 287 | 3/1982 | United Kingdom | 464/128 |

Primary Examiner—Donald P. Walsh
Assistant Examiner—William A. Rivera

[57] ABSTRACT

A universal joint bearing assembly incorporates a thrust washer molded from plastic. The plastic thrust washer eliminates the metal galling and metal debris that have been found in prior art universal joint bearings. A support notch is formed at radially outer surfaces to support an inner end of needle bearings. Resilient members bias the notch against the needle bearings such that the needle bearings are supported on the notch and against a seal at the outer end of the bearing cup. The resilient members are compressed when the universal joint is assembled such that the needle bearings operate properly. A central dome extension on the thrust washer insures that the thrust washer is not improperly mounted within the bearing cup. An outer face of the thrust washer is formed at an angle such that central portion extend further towards the trunnion than radially outer portions. In a method of assembling a bearing according to the present invention, the thrust washer is initially placed within a bearing cup and the needle bearings are then mounted within the bearing cup as is the seal. The thrust washer biases the needle bearings such that they are supported between the thrust washer and a seal. The bearing may then be shipped. When the universal joint is finally assembled, the trunnion compresses the resilient members. At that time, the bearings are free to move axially and the universal joint will operate properly.

19 Claims, 2 Drawing Sheets

RETAINED NEEDLE THRUST WASHER

BACKGROUND OF THE INVENTION

This invention relates to an improved thrust washer for use in universal joint bearing cups.

Universal joints are widely used on modern vehicles. In a standard universal joint for heavy duty applications, a cross-member having four shafts, or trunnions, connects two drive shafts. Each drive shaft has a yoke connected to two of the trunnions. Bearings are received on the trunnions, and rotatably support the yokes on the trunnions. The two drive shafts rotate together through the universal joint to transmit rotation from a source of rotation to the drive axles of the vehicle.

The prior art bearings include a bearing cup that houses a metallic thrust washer at the end of the trunnion. The thrust washer applies a force holding the bearing and trunnions at desired relative locations. A number of needle bearings extend between the thrust washer and a seal at the outer end of the bearing cup. The trunnion rotates relative to the bearing cup, resulting in metal to metal contact between the trunnion and the thrust washer. The metal to metal contact creates end galling or metal to metal rubbing, and may result in metal particles in the bearing area. Loose metal debris may shorten the life of the bearings and the universal joint.

In addition, with prior art metallic thrust washers, it is sometimes difficult to achieve precise dimensional standards. Moreover, there was only a limited degree of design features that could be utilized in the thrust washer. Thrust washers are typically very thin items, and the metal thrust washers could not be formed with complex surfaces and features and still maintain dimensional tolerances.

Also, during transport of the prior art bearing cups the needle bearings would sometimes fall radially inwardly. This occurred since in the prior art bearing cups, until the trunnion shaft was received within the bearing cup, there may sometimes be little to support the needle bearings radially outwardly of the center bore of the bearing cup.

SUMMARY OF THE INVENTION

In a disclosed embodiment of this invention, a plastic thrust washer is utilized in a universal joint bearing cup. The use of the plastic thrust washer eliminates the metal to metal contact that has occurred with the prior art.

In other features of this invention, the plastic thrust washer has a notch at its outer periphery that provides a support surface for an inner end of the needle bearings. Biasing nibs on the rear face of the thrust washer, in combination with the notch, ensure that the needle bearings are properly supported until they are mounted in yokes. In other features of the invention, the plastic thrust washer is formed with a locator portion that allows the thrust washer to be mounted in only one orientation relative to the bearing cup. The location portion insures that the assembler will not place the thrust washer upside down in the bearing cup.

In another feature of this invention, lubricant grooves extend from a central bore in the thrust washer to radially outer ends on both faces of the thrust washer. Preferably, these lubricant grooves extend generally at a tangent to the central bore. The lubricant grooves ensure that lubricant is delivered to the end surfaces of the bearing cup.

In a further feature of this invention, the front face of the thrust washer, which contacts the trunnion, is formed at an angle such that a central portion extends further towards the trunnion than outer portions. Preferably, the angle of the thrust washer is selected to be less than five degrees. In one exemplary embodiment, that angle is two degrees. The angled central portion insures that the contact between the trunnion and the thrust washer, and the majority of the force, is near the axis of rotation of the bearing. It is desirable to maintain the contact as close as possible to the center of rotation.

In a method of assembling a universal joint using the inventive thrust washer, the thrust washer is initially placed within the bearing cup. Needle bearings are then placed within the cup and the outer seal is placed within the cup. The inventive nibs bias the thrust washer outwardly against the needle bearings to bias the needle bearings against the seal. Thus, the needle bearings are held during shipment of the bearing prior to assembly within a yoke. Once the bearing is mounted in the yoke and the universal joint is fully assembled, the trunnion applies a force on the thrust washer compressing the nibs. With the nibs compressed, the thrust washer moves axially away from the inner end of the needle bearings. The needle bearings have axial clearance between the thrust washer and the seal, such that the bearings support relative rotation between the bearing cup and the trunnion. In this way, the nibs do not affect the operation of the bearing, only insuring that the needle bearings do not fall radially inwardly prior to complete assembly.

These and other features of the present invention will be best understood from the following specification and drawings, of which the following is a brief description.

DETAILED DESCRIPTION OF A PREFERRED EMBODIMENT

Figure 1:
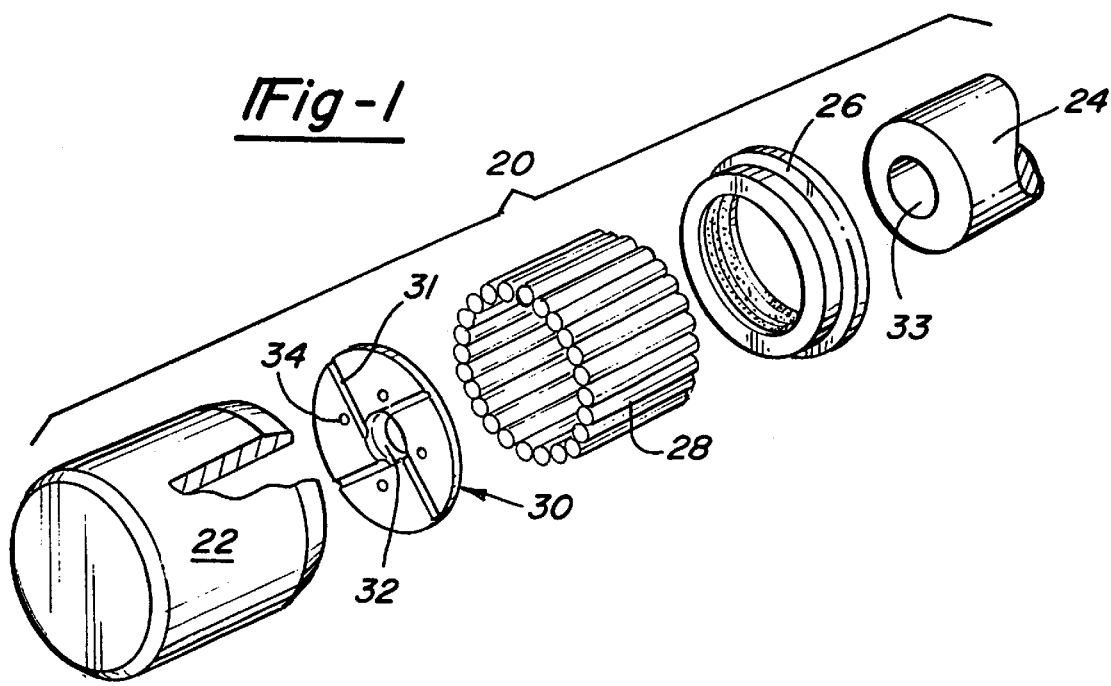
FIG. 1 is an exploded view of a bearing for a universal joint according to the present invention.

FIG. 1 shows a bearing assembly 20 for use in a universal joint. A bearing cup 22 supports a trunnion 24. A seal 26 is received at an outer end of bearing cup 22. Needle bearings 28 extend between seal 26 and the inner end of bearing cup 22. Thrust washer 30 is disposed at an inner end of bearing cup 22.

An inner face of thrust washer 30 has lubricant grooves 31 extending radially outwardly at a tangent to a central bore 32. Lubricant flows along a central bore 33 in trunnion 24, through central bore 32, and then may flow radially outwardly through grooves 31. As will be explained below, similar grooves are formed on an outer face of thrust washer 30. A plurality of nibs 34 are formed on the rear face of thrust washer 30. Nibs 34 maintain needle bearings in position until the universal joint is fully assembled, as will be explained below.

Figure 2:
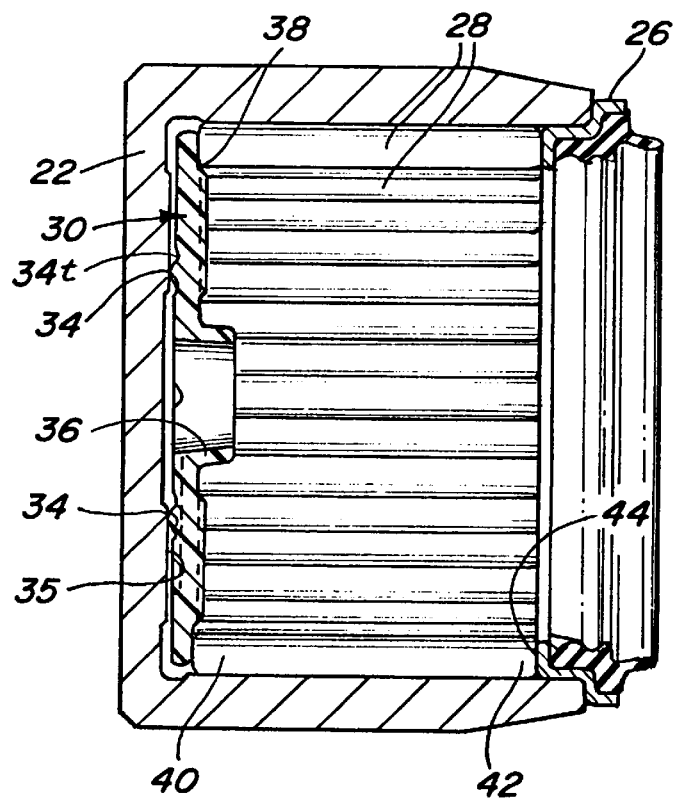
FIG. 2 is a cross-sectional view of a bearing prior to being assembled.

FIG. 2 shows bearing 20 prior to being fully assembled into the universal joint. Trunnion 24 is not mounted within the bearing cup 22. The thrust washer 30 is shown biased away from the inner wall 35 of the bearing cup 22 by nibs 34. As shown, a trough 34t surrounds the nib 34. A locator member 36 is formed about central bore 32. Locator 36 insures that an assembler will not place thrust washer 30 within bearing cup 22 in the improper orientation. That is, should the assembler place thrust washer 30 within bearing cup 22 such that the nibs 34 face outwardly, rather than as shown in this figure, locator 36 prevents further assembly. The assembler thus is notified that the thrust washer 30 has been improperly assembled.

A notch 38 is formed at a radially outer portion of the thrust washer 30. Notch 38 supports an inner end 40 of needle bearings 28. An outer end 42 of the needle bearing 28 is supported in a lip 44 of seal 26. Nibs 34 bias the thrust washer 30 away from an inner face 35 of bearing cup 22 against needle bearings 28. Needle bearings 28 are thus supported on notch 38 and seal 26, as shown. In the past, there has sometimes been a problem with needle bearings falling radially inwardly prior to assembly. Nibs 34 eliminate this concern that is, the needle bearing are held radially outwardly by the notch and the bias from the nibs.

Figure 3:
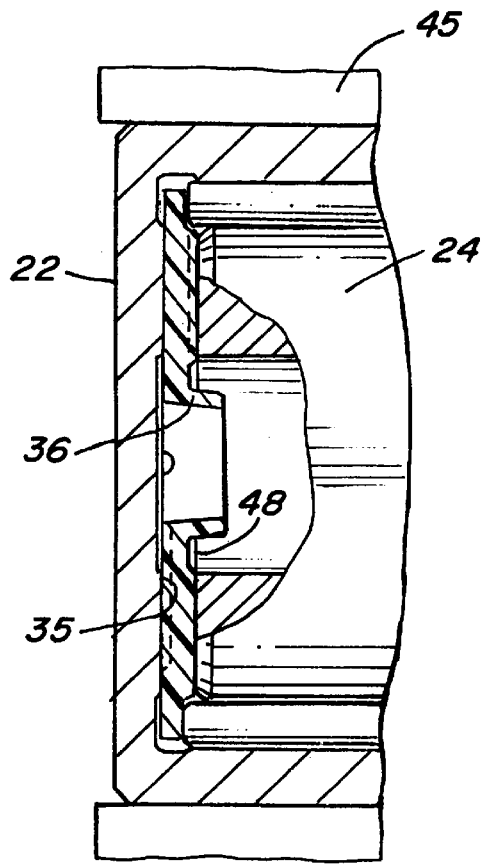
FIG. 3 shows the inventive bearing when fully assembled.

FIG. 3 shows the bearing 20 now having been fully assembled in a universal joint yoke 45. Trunnion 24 compresses thrust washer 30. Nibs 34 no longer bias thrust washer 30 away from end wall 35. Instead, the nibs 34 are collapsed and have expanded into trough 34t. The needle bearing 28 is no longer caught between notch 38 and lip 44. Trunnion 24 is now received within the bearing cup 22, and the needle bearings 28 can no longer fall radially inwardly.

As the universal joint operates, there will be a good deal of rubbing between the end of the trunnion 24 and the outer face of the thrust washer 30. However, since the inventive thrust washer is formed of a molded plastic, this rubbing will not lead to metal debris within the bearing 20. Moreover, since the thrust washer is molded of a plastic, tighter dimensional controls may be maintained on the thrust washer, and the above-described features may be designed into the thrust washer.

Figure 4:
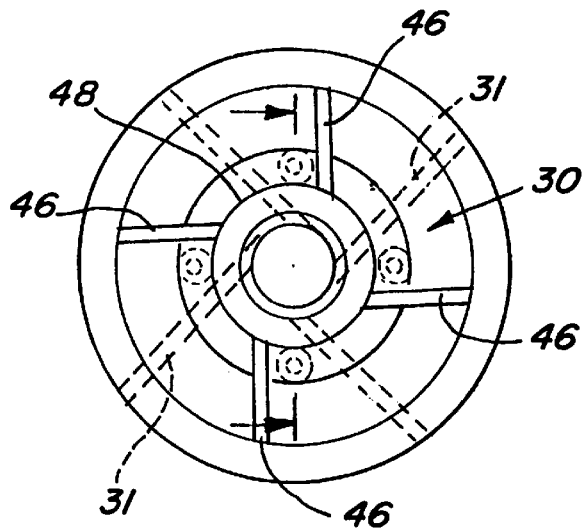
FIG. 4 is an end view of the inventive thrust washer.

FIG. 4 is a view of an outer face of thrust washer 30. Lubricant grooves 31 on the inner face and nibs 34 are shown in phantom. On the outer face, lubricant grooves 46 extend radially outwardly and generally tangent to bore 32. Lubricant grooves 46 extend radially from a central groove 48 which communicates the lubricant to the grooves 46. The use of the angled lubricant grooves on each face of the thrust washer insures adequate lubrication to bearing assembly 20.

Figure 5:
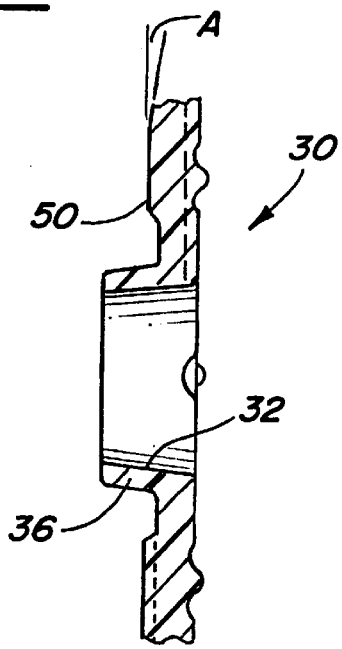
FIG. 5 is a cross-sectional view along line 5—5 as shown in FIG. 4.

As shown in FIG. 5, the central portion 50 of thrust washer 30 extends further towards the trunnion than radially outer portions. In this way, thrust washer 30 insures that the majority of the contact between the trunnion and the thrust washer is adjacent to the axis of rotation. It is desirable to maintain the bulk of the contact as close as possible to the axis of rotation. As shown, the front face is angled at a small angle A. Preferably, angle A is less than five degrees. In one specific embodiment, angle A was two degrees.

A method of assembling the universal joint utilizing the present invention will now be described. Bearing cup 22 is initially assembled by placing thrust washer 30 within the bearing cup. Needle bearings 28 are then placed within bearing cup 22, as is seal 26. Nibs 34 ensure that thrust washer 30 is biased outwardly such that the needle bearings 28 are caught between notch 38 and lip 44. Thus, prior to assembly of the entire universal joint, the needle bearings 28 are captured and maintained at the desired location. The universal joint is then assembled as is known. Trunnion 24 is mounted within the bearing 22, and the bearing is mounted in yoke 45. Nibs 34 are compressed and thrust washer 30 moves away from the position where it had captured the needle bearings 28. Needle bearings 28 are now provided with some axial freedom of movement, and can function properly.

As described above, the thrust washer is preferably molded from a strong plastic. In one application, a glass-reinforced nylon was utilized to form the thrust washer. A nylon available under the trade name Zytel from DuPont may be used. The nibs are relatively small, and in one application were 0.015 inch for a thrust washer having an approximate thickness of 0.097 inch at areas other than the nibs.

A preferred embodiment of this invention has been disclosed; however, a worker of ordinary skill in the art would recognize that certain modifications come within the scope of this invention. For that reason, the following claims should be studied to determine the true scope and content of this invention.

We claim:

1. A bearing assembly for a universal joint comprising:
   a bearing cup defining an inner peripheral surface to receive needle bearings;
   said needle bearings received adjacent said inner peripheral surface of said bearing cup;
   a seal received at an outer end of said bearing cup; and
   a thrust washer received within said bearing cup and inwardly of said needle bearings, said thrust washer being formed of a molded synthetic material, said thrust washer having a peripheral notch, said needle bearings resiliently retained outwardly radially toward said bearing cup inner peripheral surface within said notch by said seal until said bearing cup is received in a universal joint.

2. A bearing assembly as recited in claim 1, wherein said thrust washer is molded from a nylon.

3. A bearing assembly as recited in claim 1, wherein said thrust washer peripheral notch includes an outwardly facing notch at a radially outermost position, said notch supporting an inner end of said needle bearing prior to complete assembly of said bearing cup in a universal joint.

4. A bearing assembly as recited in claim 3, wherein said thrust washer has resilient members formed on an inner face of said thrust washer which contact an end wall of said bearing cup, said resilient members biasing said thrust washer away from said bearing cup end wall such that said notch captures said inner end of said needle bearings and biases said needle bearings axially outward and against said seal to maintain said needle bearings at a location adjacent said inner peripheral surface of said bearing cup.

5. A bearing assembly as recited in claim 4, wherein an outer face of said thrust washer is provided with structure that ensures said thrust washer is not mounted within said bearing cup with said outer face facing said end wall of said bearing cup.

6. A bearing assembly as recited in claim 5, wherein said structure includes a locator extending away from said outer face of said thrust washer.

7. A bearing assembly as recited in claim 1, wherein said thrust washer is provided with a plurality of lubricant grooves extending outwardly of a central bore in said thrust washer, on both an inner and outer face of said thrust washer.

8. A bearing assembly as recited in claim 7, wherein said grooves extending generally at a tangent to said central bore.

9. A bearing assembly as recited in claim 1, wherein an outer face of said thrust washer is formed such that a generally central portion is formed to extend further axially outwardly than radially outer portions.

10. A bearing assembly as recited in claim 9, wherein said outer face extends forwardly from said radially outer portion towards said central portion generally at an angle.

11. A bearing assembly as recited in claim 10, wherein said angle is less than five degrees.

12. A bearing assembly for a universal joint comprising:

a bearing cup defining an end wall and a cylindrical wall, said bearing cup defining an inner bearing receiving space;

a plurality of needle bearings received within said bearing receiving space;

a seal disposed at an outer end of said bearing cup; and a thrust washer received between said end wall of said bearing cup and an inner end of said needle bearings, a peripheral notch formed at a radially outer portion of an outer face of said thrust washer, said thrust washer having resilient members formed on an inner face, said resilient members biasing said thrust washer away from said end wall such that said notch supports said inner end of said needle bearings and biases said needle bearings into a structure on said seal to support said needle bearings radially outward within said peripheral notch and toward said bearing cup cylindrical wall.

13. A bearing assembly as recited in claim 12, wherein said resilient members are compressed when said bearing is mounted in a universal joint such that said thrust washer does not bias said needle bearings against said seal when the universal joint is fully assembled.

14. A bearing assembly as recited in claim 13, wherein said outer face of said thrust bearing is formed with structure that insures said thrust bearing is not mounted within said bearing cup with said outer face facing said end wall of said bearing cup.

15. A bearing as recited in claim 12, wherein said outer face of said thrust washer being formed such that radially outer portions do not extend as far from said end wall as a central portion of said thrust washer outer face which contacts a trunnion when the universal joint is assembled.

16. A bearing as recited in claim 15, wherein said outer face extends generally at an angle from a radially outer portion to said central portion.

17. A bearing as recited in claim 16, wherein said angle is less than five degrees.

18. A method of assembling a bearing for a universal joint comprising the steps of:

providing a bearing cup;

providing a thrust washer with a bearing support surface adjacent a radially outer portion and resilient structure on a rear face of said thrust washer, said bearing support surface formed as a peripheral radial notch;

mounting said thrust washer within said bearing cup;

mounting a plurality of needle bearings within said bearing cup such that said needle bearings rest within the peripheral radial notch;

mounting a seal at an outer end of said bearing cup, said resilient structure on said thrust washer biasing said bearing support surface on said thrust washer into said needle bearings, and said bearing support surface biasing said needle bearings axially outward and against said seal such that said needle bearings are supported within said bearing cup toward a peripheral cylindrical wall of said bearing cup; and mounting said bearing in a yoke, and mounting a trunnion within said bearing cup, said resilient members being compressed by said trunnion such that said thrust washer no longer biases said needle bearings into said seal.

19. A thrust washer for use in a bearing comprising:

a thrust washer being generally cylindrical and having an outer face and an inner face, said outer face being formed with an axially outwardly extending extension at a generally central portion of said thrust washer, said extension insuring that said thrust washer is not mounted within a bearing cup with said outer face facing an end wall of the bearing cup, said thrust washer having an axially outwardly peripheral notch formed at a radially outer portion, said peripheral notch having a substantially uniform thickness less than the overall thickness of the thrust washer; and said extension being a generally cylindrical extension surrounding a central lubricant bore.

\* \* \* \* \*